United States Patent [19]

Machida et al.

[11] Patent Number: 4,709,472
[45] Date of Patent: Dec. 1, 1987

[54] METHOD OF MANUFACTURING SPIRAL ELECTRODE ASSEMBLY

[75] Inventors: Toyoji Machida; Shyuichi Ueno, both of Hyogo, Japan

[73] Assignee: Sanyo Electric Co., Ltd., Osaka, Japan

[21] Appl. No.: 943,650

[22] Filed: Dec. 17, 1986

[30] Foreign Application Priority Data

Dec. 23, 1985 [JP] Japan ............................... 60-289807

[51] Int. Cl.⁴ ..................... H01M 4/00; H01M 6/00; H01M 6/10
[52] U.S. Cl. ..................................... 29/623; 429/94; 242/56.1
[58] Field of Search .................. 242/56.1; 29/623.1; 429/94

[56] References Cited

U.S. PATENT DOCUMENTS

| | | | |
|---|---|---|---|
| 3,490,949 | 1/1970 | Deschamps | 429/94 |
| 3,734,778 | 5/1973 | Hug et al. | 29/623.1 |
| 3,839,088 | 9/1974 | Hug et al. | 242/56.1 X |
| 4,099,401 | 7/1978 | Hug et al. | 29/623.1 X |
| 4,212,179 | 7/1980 | Juergens | 29/623.1 X |
| 4,539,271 | 9/1985 | Crabtree | 429/94 |

FOREIGN PATENT DOCUMENTS 47-50417 12/1972 Japan .
50-55843 5/1975 Japan .

Primary Examiner—Stuart S. Levy
Assistant Examiner—Steven duBois
Attorney, Agent, or Firm—Darby & Darby

[57] ABSTRACT

In a method of manufacturing a spiral electrode assembly, a first electrode member of one polarity is covered with a separator, and the separator is extended forward beyond the leading end of the first electrode member to form an extension consisting of the separator only. This separator extension is inserted into a slot formed in a spool and is wound around the spool. After the separator extension has been wound by the length more than the length of the circumference of the spool, a second electrode member of opposite polarity is inserted in such a relation that the leading end of the first electrode member is located rear relative to that of the second electrode member. The spool is rotated to wind the two electrode members separated by the separator therearound, and the spool is then withdrawn to provide the spiral electrode assembly.

8 Claims, 9 Drawing Figures

METHOD OF MANUFACTURING SPIRAL ELECTRODE ASSEMBLY

BACKGROUND OF THE INVENTION

1. Field of the Invention

This invention relates to a method of manufacturing a spiral electrode assembly. More particularly, the present invention relates to a method of manufacturing a spiral electrode assembly which comprises a positive electrode member and a negative electrode member wound into a spiral shape together with a separator interposed therebetween and which is used in, for example, a cylindrical nonaqueous electrolyte type cell or a cylindrical alkaline storage battery.

2. Description of the Related Art

A method used hitherto for the manufacture of a spiral electrode assembly of this kind has comprised the steps of inserting one of a positive and a negative electrode member covered with a separator into a slot formed in a spool, winding the electrode member around the spool, and, while winding the electrode member, inserting the other electrode member to wind the positive and negative electrode members separated by the separator around the spool.

However, according to this prior art method, the first-mentioned electrode member is bent at an angle of about 90° at the area where it protrudes from the slot of the spool to be wound around the spool. As a result, this electrode member tends to be torn at that area when it is made of a soft metal material having a low mechanical strength such as lithium, sodium or aluminum. In another case, the electrode member is broken at the bent portion, and this broken portion of the electrode member or the active material dropped off the electrode member penetrates the separator to make contact with the adjacent electrode member of opposite polarity thereby giving rise to an objectionable internal short-circuit.

With a view to obviate such a trouble, a method has been proposed in which a protective sheet is attached to each of the leading and trailing ends of the turns of an electrode member, as disclosed in U.S. Pat. No. 3,298,871. However, the proposed method has not been completely successful in that the protective sheets tend to be stripped off during winding the electrode member and, also, the electrode member tends to be broken at its bent portion, resulting in break-through of the corresponding portion of the protective sheet.

A method which improves the method disclosed in the aforementioned U.S. patent has been proposed in, for example, Japanese Patent Publication No. 47-50417 (1972). According to the method proposed in the Japanese Patent Publication, a sheet having a predetermined length, which is in the form of a film or a woven cloth of a synthetic resin, is attached at one end thereof to the leading end of an electrode member covered with a separator, and this sheet is inserted at the other end thereof into a slot of a spool and is then wound around the spool. The proposed method is advantageous in that the electrode member can be wound around the spool without being bent. However, since the sheet is attached to the leading end only of the electrode member, the sheet tends to be also detached or peeled during the winding operation. Also, a considerably large winding force cannot be applied to the sheet at the beginning of the electrode winding operation. Therefore, the electrode group completed by the winding operation is not sufficiently tight.

Further, JP-A-No. 50-55843 discloses a method comprising extending a separator beyond the leading end of an electrode member, reinforcing the separator extension by compacting it by heat fusion, inserting this reinforced separator extension into a slot of a spool, and winding the separator extension to wind, the electrode member around the spool. According to the proposed method, however, the separator extending from the leading end of the electrode member includes a portion of a large length where the separator function is lost as a result of the heat fusion, and the cell activity is lost in that portion resulting in an undesirable reduction of the cell capacity.

SUMMARY OF THE INVENTION

It is therefore an object of the present invention to solve the prior art problems pointed out above and to provide a method of manufacturing a spiral electrode assembly which can reliably prevent an objectionable short-circuit trouble in a cell.

Another object of the present invention is to provide a method of manufacturing a spiral electrode assembly which avoids damage to the electrode members and separator during winding.

Still another object of the present invention is to provide a method of manufacturing a spiral electrode assembly in which a separator ensuring a high cell efficiency is used so as to obviate such a defect that provision of a sheet, except the separator, coupled to the leading end of an electrode member tends to be peeled during winding operation resulting in impossibility of winding the electrode member or that the sheet covers a portion of the electrode member resulting in an undesirable reduction of the cell capacity, in other words, so as to eliminate provision of another member which will lessen the tightness of the spiral electrode assembly and obstruct full exhibition of the cell activity.

In accordance with the present invention, there is provided a method of manufacturing a spiral electrode assembly formed by winding a first electrode member of one polarity and a second electrode member of opposite polarity separated by a separator around a spool, the method comprising the steps of covering at least both surfaces of the first electrode member with the separator, extending the separator forward beyond the leading end of the first electrode member to form a separator extension, inserting and holding the leading end of the separator extension in a slot of a spool, winding the separator extension around the spool until the separator extension is wound around the spool by a length more than the length of the circumference of the spool, inserting the second electrode member between the turns of the separator extension in such a relation that the leading end of the first electrode member is located rear relative to the leading end of the second electrode member, rotating the spool to wind the first and second electrode members separated by the separator around the spool, and withdrawing the spool.

According to the method of the present invention, the electrode members are not forcedly bent anywhere. Therefore, the electrode members are not damaged, and an objectionable short-circuit in the cell can be prevented. Further, unlike the prior art method, a protective sheet of, for example, a synthetic resin need not be attached to the leading end of the first electrode member, and the separator need not be subjected to heat fusion. Therefore, all the portions of the electrode members including their leading end portions can effectively participate in the cell activity, and the cell capacity can be increased.

Further, the method of the present invention is advantageous in that any excessively large winding force need not be applied to the first electrode member. Therefore, a soft metal material such as lithium, sodium or aluminum or an alloy of these metals can be used to form the first electrode member.

In the method of the present invention, it is preferable to cover the widthwise marginal edges, in addition to the both surfaces, of the first electrode member with the separator. When the first electrode member is thus entirely covered with the separator, the electrode member is protected against damage by the separator and no internal short-circuit trouble occurs even if a portion of the electrode member is broken and peeled.

The separator entirely covering the first electrode member is preferably welded at its widthwise marginal edges. This welding ensures complete covering of the first electrode member by the separator. Also, the resistance of the electrode member against a tensile force applied in the longitudinal direction of the separator increases, so that, during winding the electrode member, the electrode member can be tightly wound while strongly pulling the extension of the separator. Therefore, the cell capacity can be increased.

In the method of the present invention, the spool having the slot is preferably composed of a pair of semi-cylindrical members which are disposed in slightly spaced apart relation to provide a substantially cylindrical outer peripheral surface.

When the electrode members are wound around the spool having such a structure, it is preferable that a first portion of the separator extension is inserted into the slot of the spool to protrude from the spool and is wound around the spool together with a second portion extending between the spool and the leading end of the first electrode member, so that the thickness of the portion of the separator extension engaged by the second electrode member has a thickness about two times as large as that of the other portion. Thus, even when the separator extension is strongly pulled for winding these electrode members around the spool, the portion of the separator extension is protected against the second electrode member by the portion of the separator extension and is not damaged.

BRIEF DESCRIPTION OF THE DRAWINGS

FIGS. 1 to 8 show an embodiment of the method of manufacturing a spiral electrode assembly according to the present invention, in which:

FIG. 2 is a perspective view showing an extension of the separator placed on one of semi-cylindrical pins constituting a spool together with the other pin;

FIG. 3 is a perspective view showing the separator extension held in a slot formed by setting the other pin from the state shown in FIG. 2;

FIG. 4 is a sectional view taken along the line B—B' in FIG. 3;

FIG. 5 is a sectional view showing how the separator and electrode members are wound around the spool with the rotation of the spool;

FIG. 6 is a view similar to FIG. 5 but showing a more progressed state of the winding operation;

FIG. 7 is a view similar to FIG. 6 but showing a spiral electrode assembly completed by withdrawal of the spool; and FIG. 8 is a partly sectional, front elevation view of a cell in which the spiral electrode assembly of FIG. 7 is encased in a cell casing.

DESCRIPTION OF THE PREFERRED EMBODIMENT

A preferred embodiment of the method according to the present invention will now be described in detail with reference to the drawings.

Figures 1A, 1B:
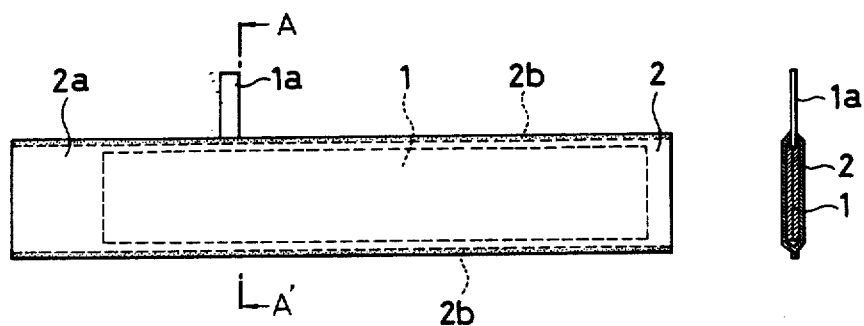
FIG. 1A is a developed view of a negative electrode member covered entirely with a separator.
FIG. 1B is a sectional view taken along the line A—A' in FIG. 1A.

As shown in FIGS. 1A and 1B, a negative electrode member 1 made of a material such as lithium is entirely covered with a separator 2 except a conductive tab $1a$ which is a current collector. The front or leading end of the separator 2 is extended beyond the front or leading end of the negative electrode member 1 to provide an extension $2a$ consisting of the separator 2 only. Preferably, the separator 2 covering the entirety of the negative electrode member 1 is provided by disposing two separator sheets on both surfaces respectively of the negative electrode member 1, superposing their marginal edges in the widthwise direction of the negative electrode member 1 and welding the separator sheets at such edges to form a pair of welds $2b$, thereby completely enclosing the negative electrode member 1 in the sheath of the separator 2. It is apparent that the method of completely enclosing the negative electrode member 1 by the separator 2 is in no way limited to that described above, and any other suitable method may be employed. For example, a separator member having a large width is bent into a U-like shape, and, after inserting the negative electrode member 1 in this U-shaped separator member, the open end of the U-shaped separator is welded under heat to completely enclose the negative electrode member 1 in the separator member.

Figure 2:
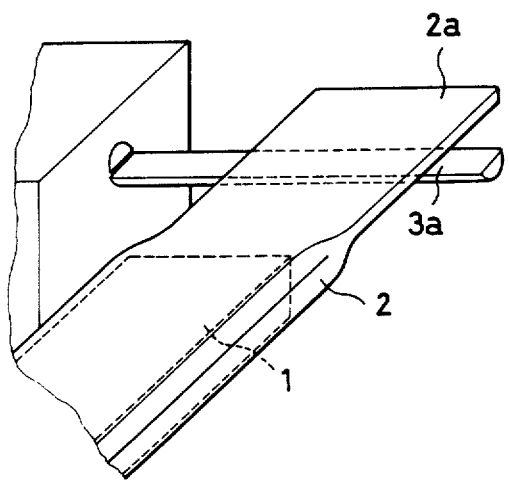
Figure 3:
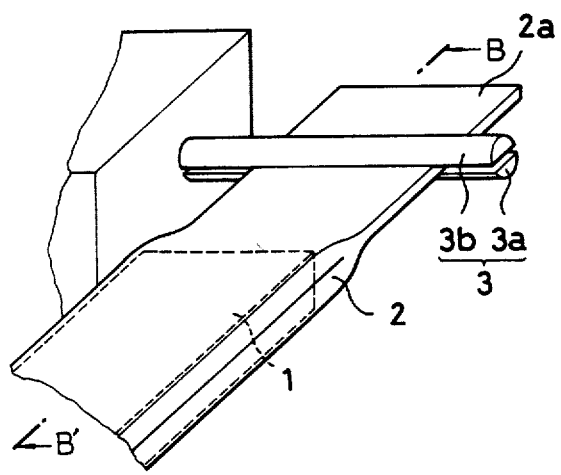
Figure 4:
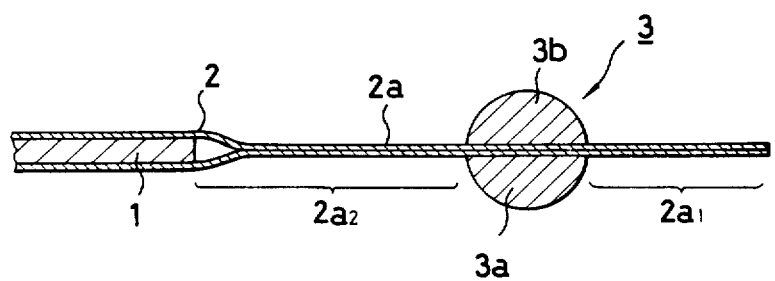

Then, as shown in FIG. 2, the extension $2a$ of the separator 2 completely enclosing the negative electrode member 1 therein is mounted on a flat surface of a pin $3a$ having a semicircular sectional shape. This pin $3a$ cooperates with a similar pin $3b$ to constitute a rotatable spool 3 having a substantially cylindrical shape as shown in FIG. 3. Then, as shown in FIGS. 3 and 4, the other pin $3b$ having also a semicircular sectional shape is set to hold the extension $2a$ of the separator 2 in a slot formed between the pins $3a$ and $3b$. In this case, the length of the portion $2a_1$ of the separator extension $2a$ protruding forward beyond the spool 3 is preferably larger than the half of the length of the circumference of the spool 3, and, also, the length of the portion $2a_2$ of the separator extension $2a$ between the spool 3 and the leading end of the negative electrode member 1 is preferably larger than the length of the circumference of the spool 3.

Figure 5:
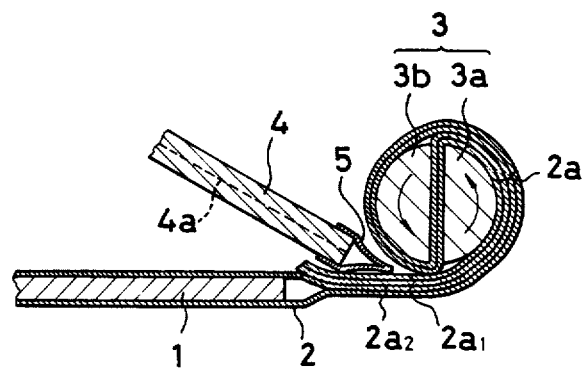
Figure 6:
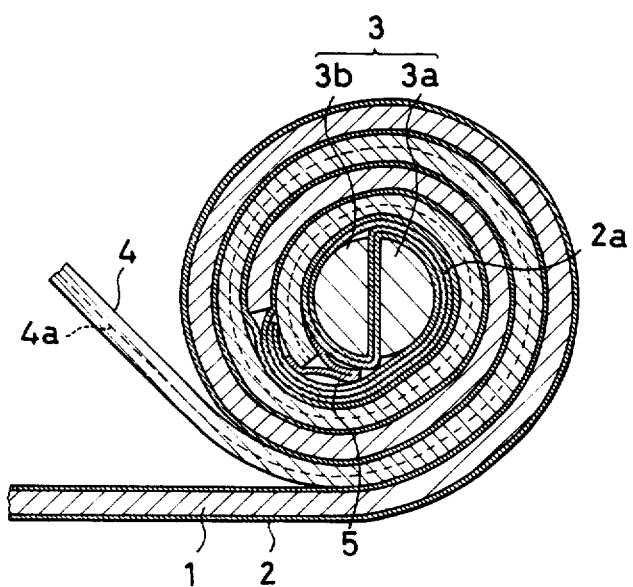

After holding the extension $2a$ of the separator 2 in the slot of the spool 3 in the manner described above, the spool 3 is rotated until the portion $2a_2$ of the separator extension $2a$ is wound around the spool 3 together with the portion $2a_1$ of the separator extension $2a$, as shown in FIG. 5. When the portion $2a_1$ of the separator extension $2a$ has been wound around the spool 3 by the length larger than the length of the circumference of the spool 3, the leading end of a positive electrode member 4 is brought to a position as shown in FIG. 5, and the positive electrode member 4 is wound around the spool 3 together with the negative electrode member 1 as shown in FIG. 6. For example, the positive electrode member 4 is prepared by molding a positive electrode-providing agent including an active material such as manganese dioxide around a supporting core 4a.

Prior to winding the positive electrode member 4, a tape 5 is bonded to the leading end of the positive electrode member 4. The positive electrode member 4 and the negative electrode member 1 are wound around the spool 3 in a state in which the leading end of the negative electrode member 1 is located rear relative to that of the positive electrode member 4 in their positions relative to the spool 3. Preferably, the tape 5 is made of an organic resin such as teflon, polypropylene, polyethylene, nylon or polyester or an inorganic material such as glass fibers or carbon fibers.

By so bonding the tape 5 to the leading end of the positive electrode member 4, the positive electrode member 4 is guided by the tape 5 to be accurately wound around the spool 3 together with the negative electrode member 1, and the tape 5 prevents damage to the separator 2 by the sharp corners of the leading end of the positive electrode member 4. Further, damage to the separator portion $2a_2$ by the sharp corners of the leading end of the hard positive electrode member 4 is more reliably prevented by the separator portion $2a_1$ interposed between the leading end of the positive electrode member 4 and the separator portion $2a_1$ during the winding operation. Further, the leading end of the negative electrode member 1 is located rear relative to that of the positive electrode member 4 at the time of winding the positive electrode member 4. Therefore, even if the separator portion $2a_2$ may be damaged by the sharp corners of the leading end of the positive electrode member 4, there is utterly no possibility of occurrence of an internal short-circuit since the negative electrode member 1 is not present in the area of the separator portion $2a_2$ which may be damaged. Further, since the sheets forming the separator 2 are welded at their widthwise marginal edges, the negative electrode member 1 and the separator 2 can be pulled in their longitudinal direction by applying a strong winding force, so that the members 1, 2 and 4 can be tightly wound around the spool 3.

Figure 7:
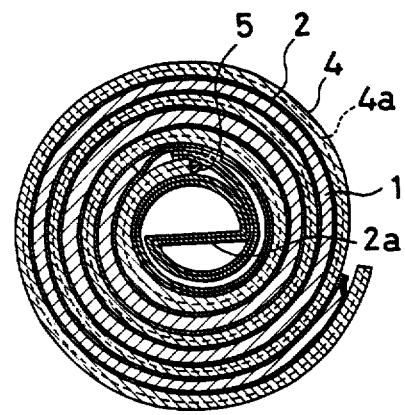
Figure 8:
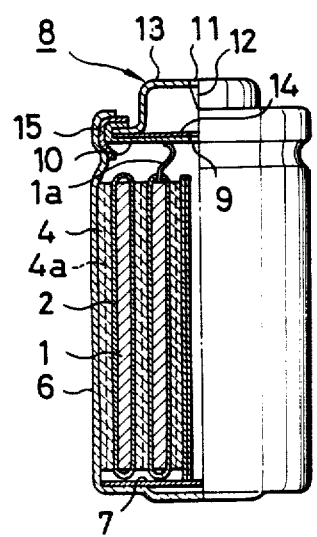

After the negative electrode member 1, separator 2 and positive electrode member 4 have been completely wound around the spool 3, the spool 3 is withdrawn to provide a spiral electrode assembly having a structure as shown in FIG. 7. Then, this spiral electrode assembly is incorporated in a cell casing 6 to obtain a cylindrical, nonaqueous electrolyte type cell as shown in FIG. 8. The cell casing 6 serves also as a positive terminal, and an electrical insulating sheet 7 is disposed on the inner bottom surface of the cell casing 6. A sealing cap 8 acting also as a negative terminal includes a sealing member 10 formed with a valve opening 9, a dish-like terminal plate 13 having a gas venting hole 11 and a cutter blade 12, and a flexible thin plate 14. An electrical insulating packing 15 is disposed between the cell casing 6 and the sealing cap 8 to complete the cell.

It will be understood from the foregoing description that, according to the method of manufacturing a spiral electrode assembly of the present invention, a portion consisting of a separator only is wound in a first step of the winding operation, thereby eliminating winding of a portion of one of electrode members at an angle of about 90° resulting frequently in an objectionable short-circuit trouble attributable to collapse of that portion of the electrode member. In a second step of the winding operation according to the present invention, the other electrode member is wound prior to winding of the former electrode member, so that, even when the separator may be damaged by the sharp corners of the leading end of the latter electrode member, the absence of the former electrode member in the area opposite to the sharp corners of the leading end of the latter electrode member would not cause an objectionable internal short-circuit at such an area. Therefore, a hard electrode member including a supporting core can be satisfactorily used as the other or latter electrode member without giving rise to the internal short-circuit trouble.

Further, in the method of the present invention, one of the electrode members or the negative electrode member is covered on at least its both surfaces with the separator, and the leading end of the separator extends beyond the leading end of the negative electrode member. This separator extension only is preliminarily wound so that any excessive winding force is not applied to the negative electrode member. Therefore, this electrode member can be made of a soft metal material not having a large mechanical strength such as lithium, sodium, aluminum or their alloy.

Further, in the present invention, the leading end portion of the negative electrode members is covered less with a material except the separator than in the case of prior art cell electrode assemblies. Therefore, the entire negative electrode member including its leading end portion can effectively participate in the cell function thereby increasing the cell capacity.

We claim:

1. A method of manufacturing a spiral electrode assembly formed by winding a first electrode member of one polarity and a second electrode member of opposite polarity separated by a separator around a spool, said method comprising the steps of covering at least both surfaces of the first electrode member with the separator, extending said separator forward beyond the leading end of said first electrode member to form a separator extension, inserting and holding the leading end of said separator extension in a slot of a spool, winding said separator extension around said spool until said separator extension is wound around said spool by a length more than the length of the circumference of said spool, inserting the second electrode member between the turns of said separator extension in such a relation that the leading end of said first electrode member is located rear relative to the leading end of said second electrode member, rotating said spool to wind said first and second electrode members separated by said separator around said spool, and withdrawing said spool.

2. A method of manufacturing a spiral electrode assembly according to claim 1, wherein said first electrode member is made of a soft metal material selected from the group consisting of lithium, sodium, aluminum and suitable combinations of these elements.

3. A method of manufacturing a spiral electrode assembly according to claim 1, wherein said second electrode member is made of an active material molded on a supporting core.

4. A method of manufacturing a spiral electrode assembly according to claim 1, wherein said first electrode member is entirely covered with said separator.

5. A method of manufacturing a spiral electrode assembly according to claim 4, wherein said separator covering the entirety of said first electrode member is welded at the widthwise marginal edges thereof.

6. A method of manufacturing a spiral electrode assembly according to claim 1, wherein said spool having said slot is composed of a pair of semi-cylindrical members which are disposed in slightly spaced apart relation to provide a substantially cylindrical outer peripheral surface.

7. A method of manufacturing a spiral electrode assembly according to claim 6, wherein a first portion of said separator extension is inserted into said slot of said spool to protrude from said spool and is wound around said spool together with a second portion extending between said spool and the leading end of said first electrode member, so that the thickness of the portion of said separator extension engaged by said second electrode member has a thickness about two times as large as that of the other portion.

8. A method of manufacturing a spiral electrode assembly according to claim 1, wherein a protective tape is bonded to the leading end of said second electrode member.

* * * * *

UNITED STATES PATENT AND TRADEMARK OFFICE
CERTIFICATE OF CORRECTION

PATENT NO. : 4,709,472

DATED : December 1, 1987

INVENTOR(S) : Toyoji Machida et al.

It is certified that error appears in the above-identified patent and that said Letters Patent is hereby corrected as shown below:

On the title page, Iten [75] should read

-- [75] Inventors: Toyoji Machida, Shyuichi Ueno, Yukiteru Yoshihira, Satoshi Sakamoto, all of Hygo-Ken, Japan --.

Signed and Sealed this

Twenty-first Day of June, 1988

Attest:

DONALD J. QUIGG

Attesting Officer

Commissioner of Patents and Trademarks